(12) United States Patent
Agrawal et al.

(10) Patent No.: US 8,229,244 B2
(45) Date of Patent: Jul. 24, 2012

(54) MULTI-IMAGE DEBLURRING

(75) Inventors: Amit Agrawal, Somerville, MA (US);
Yi Xu, West Lafayette, IN (US);
Ramesh Raskar, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 757 days.

(21) Appl. No.: 12/414,162

(22) Filed: Mar. 30, 2009

(65) Prior Publication Data

US 2010/0246989 A1    Sep. 30, 2010

(51) Int. Cl.
*G06K 9/40* (2006.01)
*H04N 5/225* (2006.01)
(52) U.S. Cl. .................................. 382/255; 348/208.13
(58) Field of Classification Search .................. 382/205, 382/255, 284, 285, 312, 264, 274–276; 703/2; 348/254, 207.99, 208.4, 208.13
See application file for complete search history.

(56) References Cited

U.S. PATENT DOCUMENTS

| | | | | | |
|---|---|---|---|---|---|
| 4,532,548 | A | * | 7/1985 | Zwirn | 348/625 |
| 5,818,964 | A | * | 10/1998 | Itoh | 382/205 |
| 7,197,193 | B2 | * | 3/2007 | Li et al. | 382/285 |
| 7,440,634 | B2 | * | 10/2008 | Ben-Ezra et al. | 382/255 |
| 7,463,296 | B2 | * | 12/2008 | Sun et al. | 348/254 |
| 7,558,709 | B2 | * | 7/2009 | Subbarao | 703/2 |
| 7,616,826 | B2 | * | 11/2009 | Freeman et al. | 382/255 |
| 7,680,354 | B2 | * | 3/2010 | Mei et al. | 382/255 |
| 7,756,407 | B2 | * | 7/2010 | Raskar | 396/55 |
| 8,068,687 | B2 | * | 11/2011 | Nishiyama et al. | 382/255 |
| 8,098,948 | B1 | * | 1/2012 | Tzur et al. | 382/255 |

* cited by examiner

*Primary Examiner* — Kanjibhai Patel
(74) *Attorney, Agent, or Firm* — Dirk Brinkman; Gene Vinokur

(57) ABSTRACT

Embodiments of the invention describe a method for reducing a blur in an image of a scene. First, we acquire a set of images of the scene, wherein each image in the set of images includes an object having a blur associated with a point spread function (PSF) forming a set of point spread functions (PSFs), wherein the set of PSFs is suitable for null-filling operation. Next, we invert jointly the set of images and the set of PSFs to produce an output image having a reduced blur.

19 Claims, 6 Drawing Sheets

MULTI-IMAGE DEBLURRING

FIELD OF THE INVENTION

This invention related generally to image processing, and more particularly to removing motion blur effects in images acquired of a moving object.

BACKGROUND OF THE INVENTION

Motion blurs result from relative motion between the camera and the scene while an image is acquired. Motion blurred images can be restored up to lost spatial frequencies by image deconvolution, provided that the motion is shift-invariant, at least locally, and that a blur function, also known as a point spread function (PSF), that caused the blur is known.

Maintaining invertible motion PSF is not possible in conventional images. A box function due to a finite exposure time corresponds to a convolution with a low pass filter, and hence a frequency transform of the PSF contains zeros (nulls). The frequencies corresponding to the nulls of the PSF are lost, which makes the deblurring ineffective. Conventional methods use specialized cameras to determine the PSF.

For example, one conventional method opens and closes a shutter during an exposure time using a broadband binary code. The broadband code does not have any nulls in the frequency domain, thereby making the resulting PSF invertible. However, that method requires specialized hardware, assumes a constant background, and requires a manual PSF estimation and object segmentation.

A motion invariant imaging method moves the camera with a constant acceleration while acquiring the image. The key idea is to make the motion PSF invariant to object velocity within a certain range. This makes segmentation and PSF estimation unnecessary. However, that method requires a prior knowledge of the direction of the motion, creates artifacts at object boundaries due to occluding background, and critically introduces blur even in the static parts of the scene.

A wavefront coding method uses a cubic phase plate in front of the lens to make the PSF invariant to scene depths. However, that method results in defocus blur on scene parts originally in focus.

Another method open and closes the shutter of the camera with a broadband binary code to make the PSF invertible. Accelerating camera motion makes the motion PSF invariant to the velocity of the object, at the cost of blurring static parts.

Conventional consumer cameras perform image stabilization using adaptive optical elements controlled by inertial sensors to compensate for camera motion.

A hybrid Camera uses a hybrid imaging system that estimates the PSF using an auxiliary low-resolution high frame rate to deblur the high resolution primary sensor images. However, that method requires an auxiliary camera for PSF estimation.

Motion PSF has been estimated by combining partial information from successive images having two different exposures: a short exposure for PSF estimation and a long exposure for an image deblurring using the estimated PSF. However, a special camera is required for acquiring the image with a short exposure.

Multiple co-located cameras with overlapped exposure time and reconfigurable multi-camera array have also been used to increase the temporal resolution of the acquired images. However, it is desired to use a single conventional camera for PSF inversion.

It is therefore desired to deblur of a scene even if the PSF of each image is non-invertible due to a blur, and the images are acquired by a single conventional camera.

SUMMARY OF THE INVENTION

It is an object of subject invention to invert motion blur in a set of images even if the point-spread function (PSF) of each image is non-invertible due to a blur.

Blurred images exhibit nulls (zeros) in the frequency transform of the PSF, leading to an ill-posed deconvolution. Hardware solutions to avoid this problem require specialized devices such as a coded exposure camera or an accelerating sensor motion. We use conventional video cameras and introduce the notion of null-filling and joint-invertability of multiple PSFs. The key realization is to acquire a set of images of the scene with varying PSFs, so that nulls in the frequency component of one image can be filled by other images. The combined frequency transform becomes null-free, making deblurring well-posed.

Embodiments of the invention describe a method for reducing a blur in an image of a scene. First, we acquire a set of images of the scene, wherein each image in the set of images includes an object having an associated blur and point spread function (PSF) forming a set of point spread functions (PSFs), wherein the set of PSFs is jointly-suitable for null-filling operation. Next, we invert jointly the set of images and the set of PSFs to produce an output image having a reduced blur.

DETAILED DESCRIPTION OF THE PREFERRED EMBODIMENT

Figure 1:
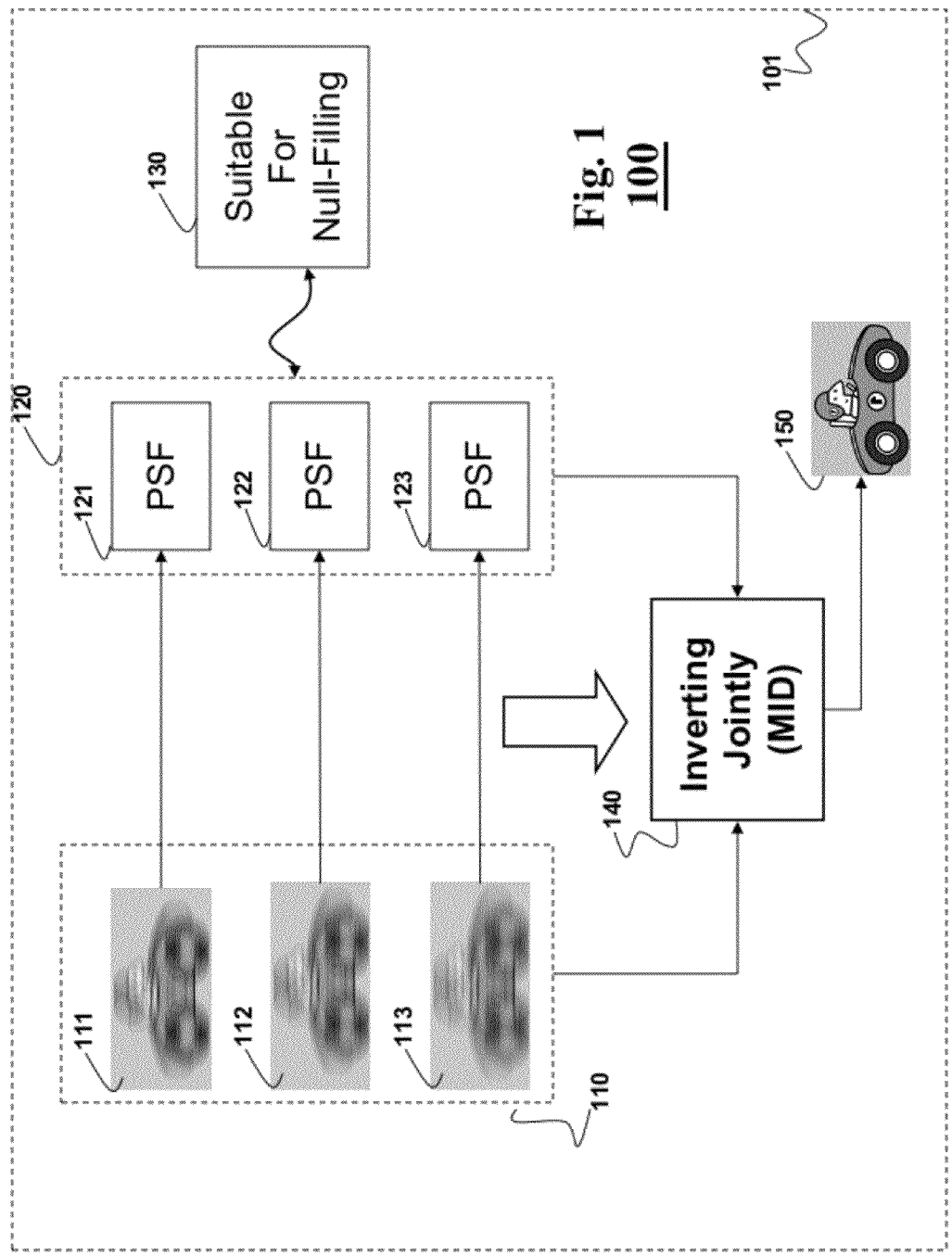
FIG. 1 is a block diagram of a method for multi-image deblurring according embodiments of invention.

FIG. 1 shows a method 100 for multi-image deblurring of a set of images 110 of a scene according to embodiments of out invention. Each image 111-113 includes an object having a blur associated with a set 120 of point spread function (PSF) 121-123. The method inverts jointly 140 the set of images using the set of PSFs to produce an output image 150 having a reduced blur. The steps of the method are performed by a processor 101.

The images 110 are acquire by a camera such that the set of PSFs is suitable for a null-filling operation 130. The suitability is achieved by acquiring the images with different exposure times.

For example, in one embodiment, a first image 111 is acquired with a first exposure time, and a second image 112 is acquired with a second exposure time that is not an integer multiple of the first exposure time. In some embodiments, we use a conventional camera having an auto exposure bracketing (AEB). AEB enables the camera to take a sequence of images at different exposures.

Figure 2:
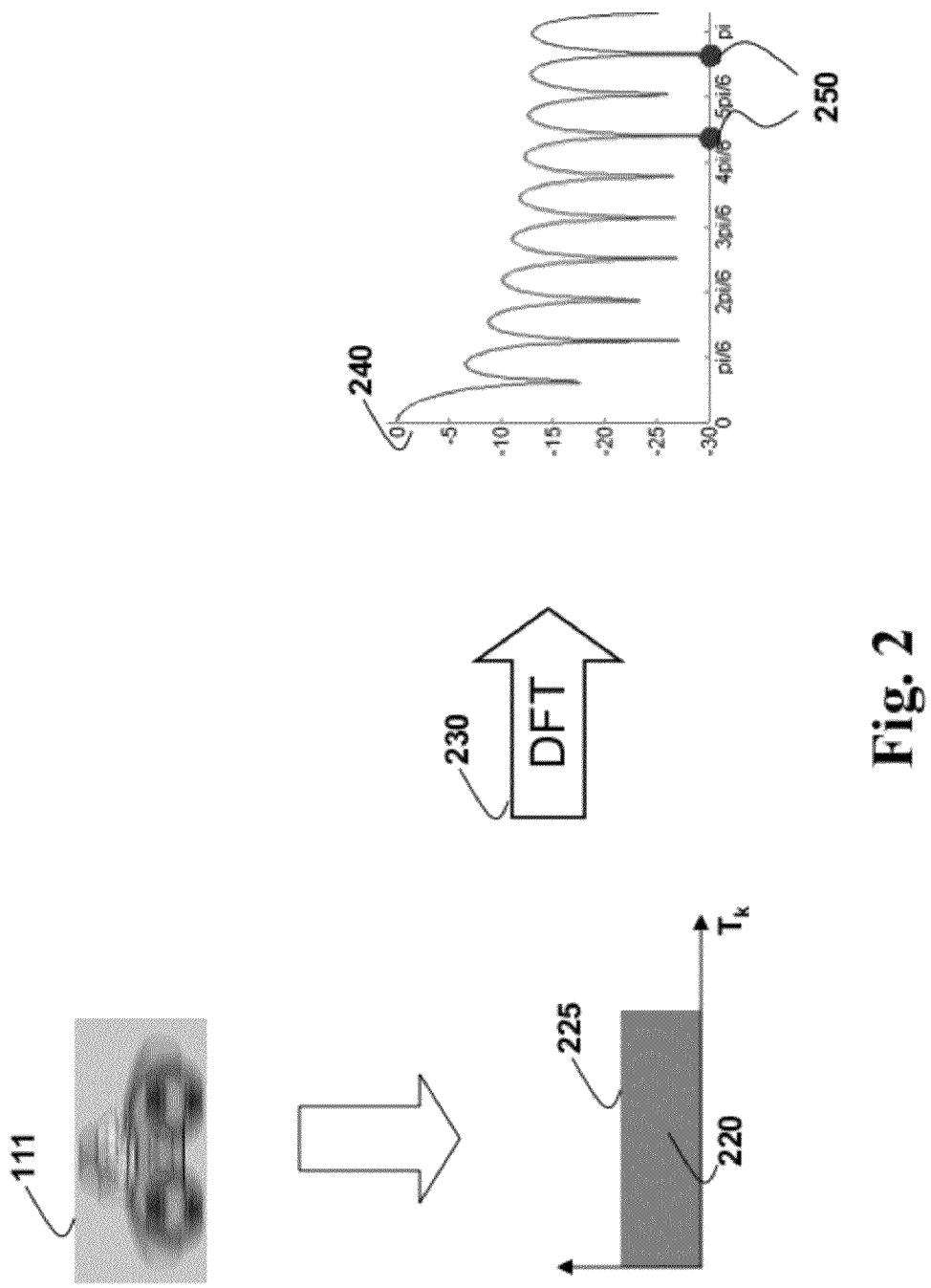
FIG. 2 is a schematic of an ill-posed point spread function (PSF) according the embodiments of the invention.

As shown in FIG. 2, for a single image 111 acquired by the camera with a conventional exposure, the motion PSF is a box filter 220. The discrete Fourier transform (DFT) 230 of the PSF is a sine cardinal (sinc) function 240, which contains zeros 250, thus making the deblurring ill-posed. The set of PSFs 120 includes a first PSF 121, a value of the first PSF at a particular frequency 250 equals zero, and a second PSF 122, wherein a value of the second PSF at the particular frequency does not equal zero.

Figure 3:
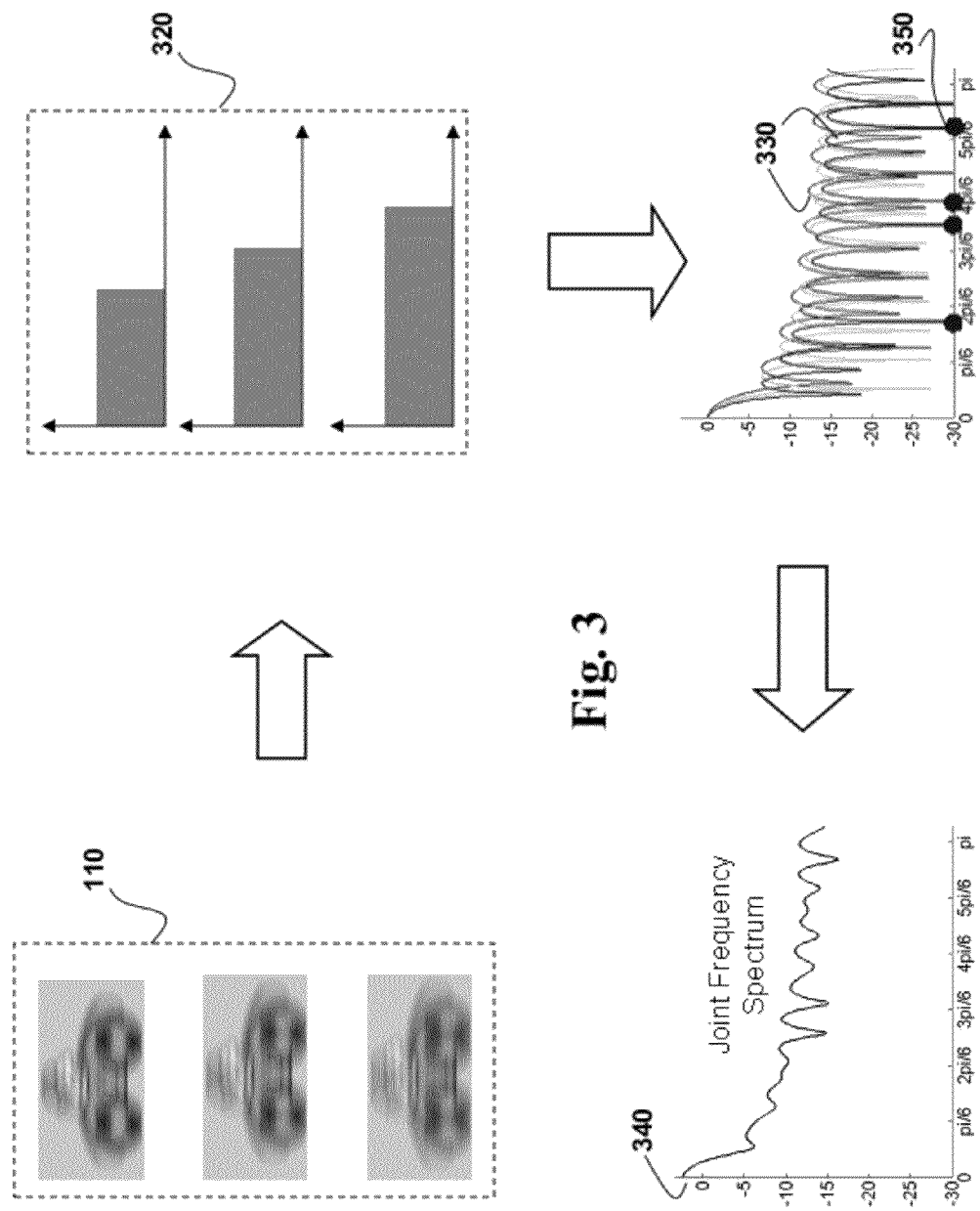
FIG. 3 is a schematic of PSFs null-filling according the embodiments of the invention.

The embodiments of the invention use a novel concept of a PSF null-filling. FIG. 3 shows that by combining multiple images 110 acquired with different exposure times 320, the nulls in each individual PSF 330 are filled with data from other PSF. Accordingly, the combined PSF 340 makes the debluring 140 well-conditioned.

Joint Invertability of Non-Invertible PSFs

Let f denote a sharp image of a scene including an object. We take N blurred images $i_k$ of the object, wherein each image $i_k$ has a different PSF $h_k$ forming a set of PSFs $$i_k = f * h_k + n_k, k=1 \ldots N, \quad (1)$$

where * is a convolution operator and $n_k$ is zero mean additive white Gaussian noise with variance $\sigma_k^2$. Let $T_k$ be an exposure time for the $k^{th}$ image. We denote the Fourier transform of quantities using capital letters. The Fourier transform F(w), where w is a frequency, of the images I(w) is $$I_k(w) = F(w)H_k(w) + N_k(w) \; k=1 \ldots N. \quad (2)$$

If one-dimensional object motion is parallel to a sensor plane with constant velocity, then each of the PSFs correspond to a box filter 220 whose length 225 is proportional to the exposure time $T_k$. Let $r_k$ be the blur size in the $k^{th}$ frame. Then $$h_k(x) = 1/r_k \; 0 < x < r_k. \quad (3)$$

Single image deblurring (SID) of any individual image is $$F(w) = I_k(w)V_k(w) = \frac{I_k(w)}{H_k(w)} = F(w) + \frac{N_k(w)}{H_k(w)}, \quad (4)$$

where F(w) denote the Fourier transform of the deblurred image and $$V_k(w) = \frac{1}{H_k(w)} = \frac{H_k^*(w)}{|H_k(w)|^2}$$

is a Fourier transform of a corresponding deconvolution filter $v_k$.

FIG. 3 shows a method for multi-image deblurring (MID), e.g., using N images 110. In the preferred embodiment, an optimal deconvolution filters $V_k(w)$ is obtained by minimizing the noise power in the output deblurred image by $$\sum_{k=1}^{N} N_k^2(w)|V_k(w)|^2$$

at each frequency w. Note that $$\sum_{k=1}^{N} V_k(w)H_k(w) = 1$$

to recover the sharp image.

Using Lagrange multiplier, the cost function is:

$$J(w) = \sum_{k=1}^{N} N_k^2(w)|V_k(w)|^2 + \lambda \left( \sum_{k=1}^{N} V_k(w)H_k(w) - 1 \right), \quad (5)$$

accordingly:

$$V_k(w) = \frac{H_k^*(w)/N_k^2(w)}{\sum_{k=1}^{N} |H_k(w)|^2 / N_k^2(w)}, \quad (6)$$

$$F(w) = \sum_{k=1}^{N} I_k(w)V_k(w) = F(w) + \frac{\sum_{k=1}^{N} H_k^*(w)/N_k(w)}{\sum_{k=1}^{N} |H_k(w)|^2 / N_k^2(w)}. \quad (7)$$

If there are common zeros among all the PSFs 330 at a particular frequency w 350, then $H_k(w)=0$ for all k at that frequency and V(w) becomes unstable.

If there are no common zeros in the Fourier transform of the PSFs, then the information lost in each individual image is acquired by some other image. The zeros in each individual PSF are filled by other PSFs.

Thus, if the set of PSFs does not have common zeros, then the combined deconvolution can be made well-posed, even though each PSF is non-invertible, i.e., the set of PSF is suitable for null-filling.

In one embodiment, the PSF is a motion PSF. However, other types of PSF are used by the embodiments. For motion PSF, this requires that the exposure times should not be integer multiples of each other $$P(w) = \sqrt{\sum_{k=1}^{N} |H_k(w)|^2 / N_k^2(w)}$$

is an operator for combined deconvolution.

Multi-Image Deblurring

Figure 4:
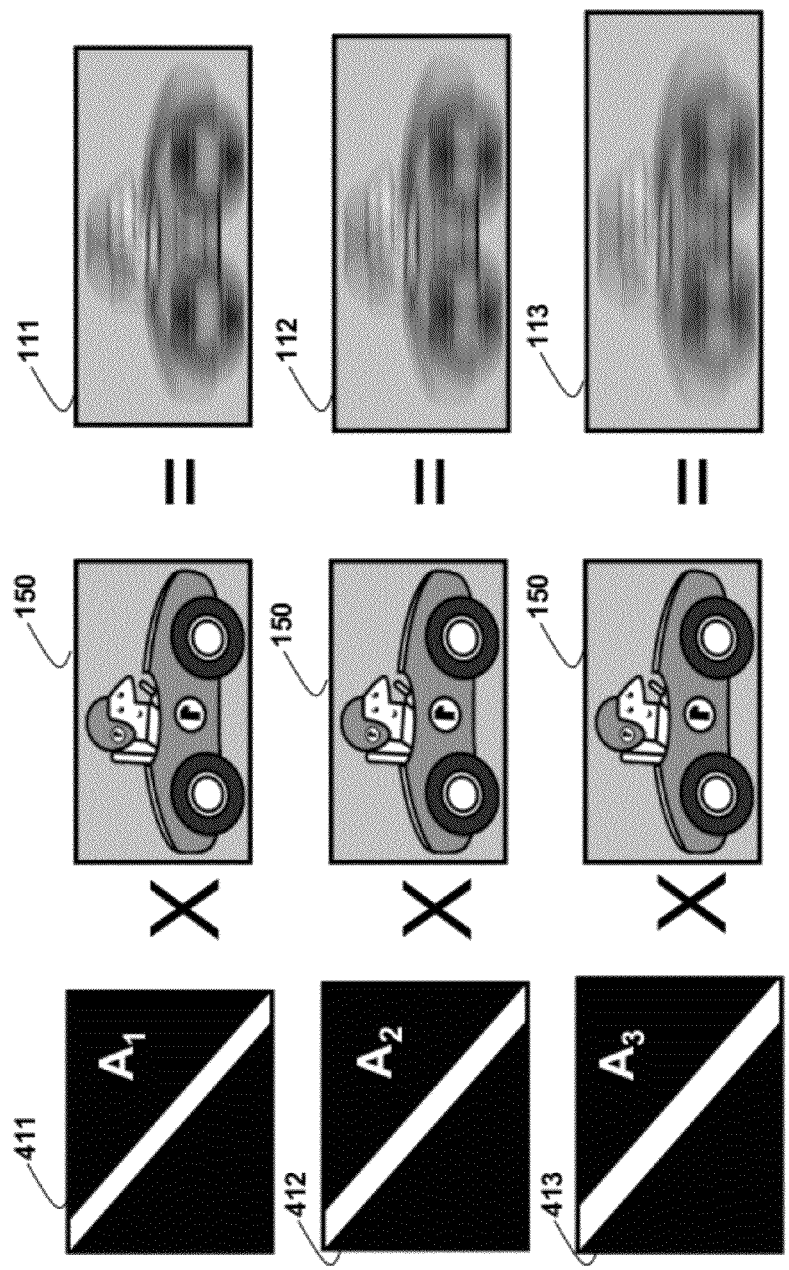
FIG. 4 is a block diagram of a single image deblurring according the embodiments of the invention.

We formulate the motion blur as a motion smear matrix multiplied by the sharp image. As shown on FIG. 4, for a single image deblurring (SID), the images 111-113 are recovered with multiplication of motion smear matrices 411-413 by the sharp image 150. However, if the PSF is ill-conditioned, then the deblurring is not satisfactory because the motion smear matrix is determined by the PSF.

Figure 5:
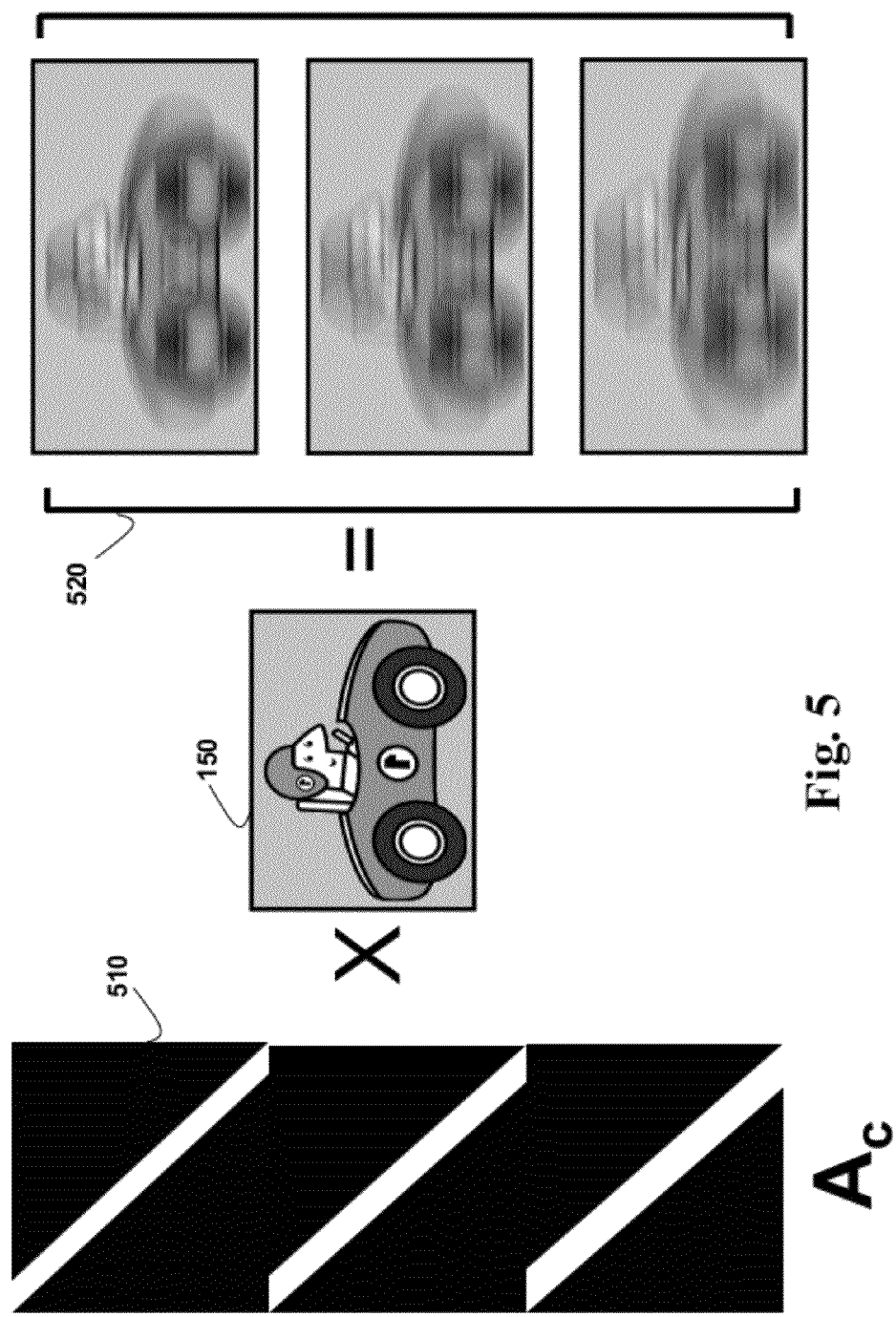
FIG. 5 is a block diagram of a combined linear system for multi-image debluring according the embodiments of the invention.

FIG. 5 shows a combined linear system for multi-image deblurring (MID), in which we combine the matrices 510 and the images 520. The singular values of motion blur matrices show that the combined deblurring system $A_c$ is better conditioned.

The convolution equation in the discrete domain is $i_k = A_k f + n_k$ for each motion line, where $A_k$ is a circulant motion smear matrix for the image k, $i_k$ is a vector describing a blurred object, f is a vector describing a sharp object, and $n_k$ is a vector describing noise intensities along each motion line. For SID, a vector $\hat{f}$ describing a deblurred object is obtained by minimizing the cost function $J=(i_k-A_k f)^T(i_k-A_k f)$ resulting in $$\hat{f} = (A_k^T A_k)^{-1} A_k^T i_k. \quad (8)$$

Similarly, for MID, the combined linear equation is $$\begin{bmatrix} i_1 \\ \vdots \\ i_k \end{bmatrix} = \begin{bmatrix} A_1 \\ \vdots \\ A_k \end{bmatrix} f + \begin{bmatrix} n_1 \\ \vdots \\ n_k \end{bmatrix} = A_c f + n_c. \quad (9)$$

In Equation (9), $A_c$ is a combined covariance matrix, and $n_c$ is a noise variance.

In some embodiments, the estimated deblurred vector $\hat{f}$ is obtained by minimizing the cost function $$J = n_c^T n_c = \sum_{k=1}^{N} (i_k - A_k f)^T (i_k - A_k f), \quad (10)$$

which yield $$\hat{f} = \left(\sum_{k=1}^{N} A_k^T A_k\right)^{-1} \left(\sum_{k=1}^{N} A_k^T i_k\right).$$

Accordingly, we invert jointly the set of images and the set of PSFs using Equation (10) to produce an output image having a reduced blur.

Exposure Sequence Optimization

In one embodiment, we search for the exposure times to maximize the minimum of the combined operator P. In another embodiment, we incorporate sensor noise characteristics to account for signal dependent noise. Since the variance of the electrons generated by photons linearly increases with the measured signal, the exposure time, $\sigma_k^2$ is given by $\sigma_{gray}^2 + \beta T_k$, where $\sigma_{gray}^2$ is the dark noise and $\beta$ is a camera dependent constant.

Using these parameters, we obtain the optimal exposure sequence by minimizing the decrease in signal-to-noise ratio (SNR) given by nf. For coded exposure, the search space is of the order of $2^n$, where n is the code length, e.g. 52. The number of unknowns for MID is equal to the number of different exposure time used. Typically, three or four different exposure times are sufficient for deblurring, and thus the search is relatively small.

Automatic Deblurring

Figure 6:
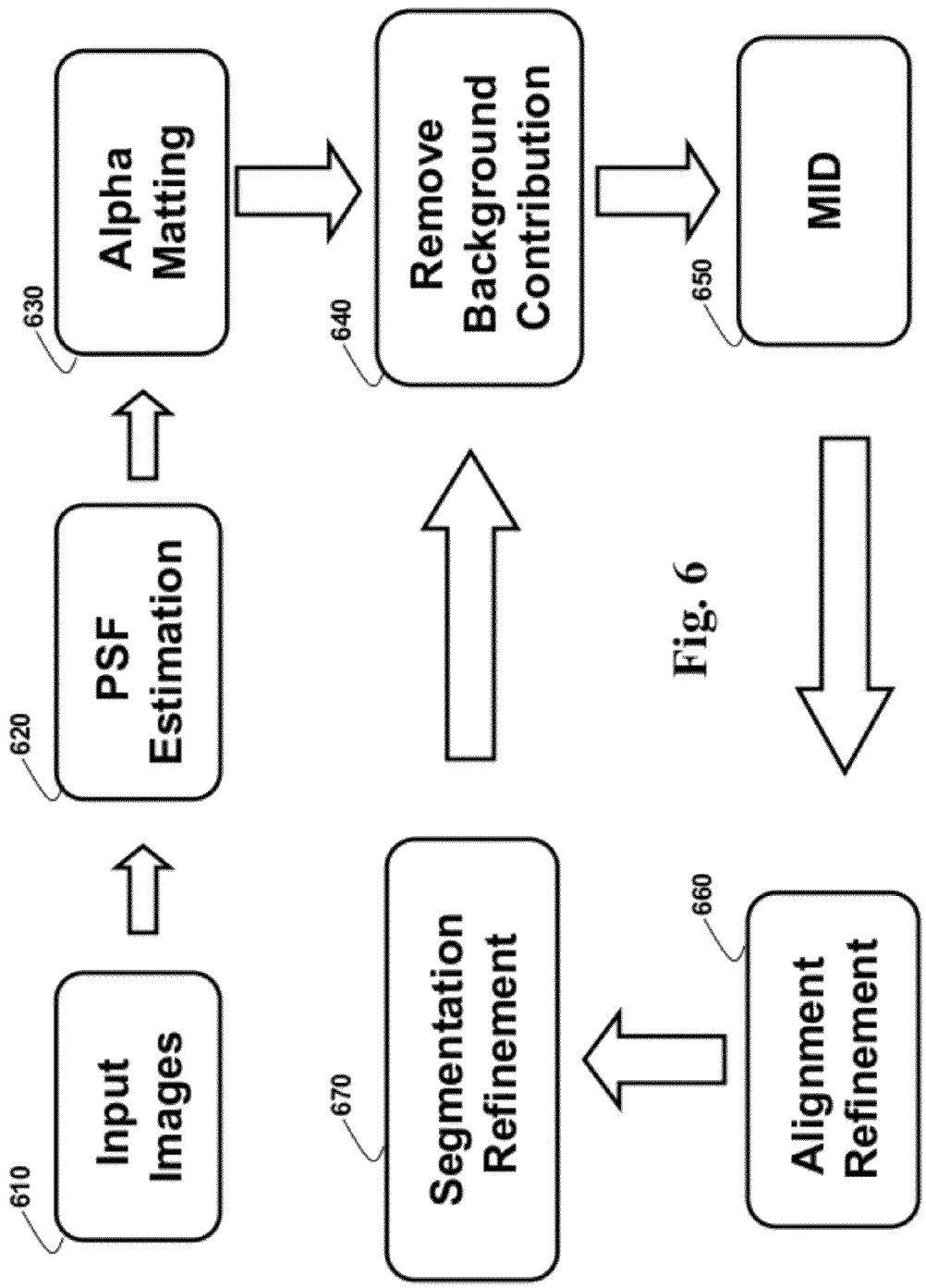
FIG. 6 is a block diagram of a method for automatic deblurring according the embodiments of the invention.

FIG. 6 shows a block diagram of the automatic deblurring method. Embodiments of the invention use joint PSF invertability for deblurring the images 610 having an object moving in front of a non-smooth background.

PSF Estimation

For spatially invariant blur, PSF estimation 620 is represented as the multiplication of the image-space object velocity v and the exposure time for each image. Object velocity is the ratio between an inter-image motion vector and an inter-image time lapse. For the spatially invariant blur, the inter-image motion vector is computed by matching corresponding image patches. However, different exposure times lead to different sizes of blur; and thus to facilitate matching and PSF estimation we repeat the exposure sequence for acquiring the images. Thus, every $N^{th}$ image in the set of images 610 has the same exposure, where N is the number of different exposures used (≈3-4). Motion vectors can be computed by matching the images acquired using the same exposure. Averaging the motion vectors for different exposures gives the final estimate of the PSF.

Initialization

Let $m_k(x,y)$ be the binary mask for the object in the $k^{th}$ image and $T_i$ be the inter-frame time. If $b(x,y)$ is the background image without the object, then the acquired motion blurred images $i_k$ are given by $$i_k = (f \cdot m_k) * h_k + (1 - h_k * m_k) \cdot b. \quad (17)$$

We first estimate the background b. In some embodiments, the object moves sufficiently fast, i.e., each background pixel is occluded by the object in less than 50% the images. Therefore, we use a median filtering along a temporal direction. For slow moving objects, we use the background subtraction to determine the background b.

A blurred image has contributions from both the blurred foreground and the background. The image blurring Equation (17) can be written in terms of an alpha matting equation as $$i_k = \alpha g + (1-\alpha) \cdot b, \quad (18)$$

where $$g = \frac{(f \cdot m_k) * h_k}{h_k * m_k}$$

and $\alpha_k = h_k * m_k$. Deblurring of alpha maps can recover the binary segmentation mask $m_k$. Matting is typically used for non-opaque static objects, and we assume that the foreground motion blurred object is opaque and in sharp focus. Thus, the alpha map depends only on the motion blur and the matting foreground actually corresponds to the blurred object and not to the sharp object.

To compute initial alpha maps 630, we first generate a crude trimap for each image by thresholding the difference between the input image $i_k$ and the background image b. The trimap is 1 for the interior of the moving object, and is 0 for a background and unknown for the blurred region. Morphological operations, such as hole-filling are applied to reduce noise. Using the trimap, alpha matting is performed on each frame independently.

The blurred foreground $f_k^b$ is obtained by removing the background contribution 640 from each input image as $$f_k^b = i_k - (1-\alpha) \cdot b. \quad (19)$$

For spatially invariant motion blur, the alpha map is a ramp along each motion line and noisy.

Multi-Image Deblurring (MID)

Since the object appears at different locations in successive images, the blurred foreground $f_k^b$ needs to be aligned before deconvolution. For linear constant motion, the alignment corresponds to a shift in the image plane. Since we have the object velocity v, the shift between $i^{th}$ and $(i+1)^{th}$ image is $v*T_i$. After aligning the blurred foreground, deblurring is performed using MID 650 by solving the Equation (10). Due to noisy alpha maps, this initial estimate of deblurred image is noisy and contains erroneous background contribution.

Refinement

The alignment of the foreground layers in the previous step can be slightly off, because motion may not be constant assumption in real world scenes. The misalignment causes errors in deconvolution. We refine the alignment 660 using the deblurred foreground f obtained in previous step. Specifically, we blur the sharp foreground f using the blur kernels $h_k$ and find the shift between the synthetic blurred foreground and $f_k^b$. Thus, all blurred foreground $f_k^b$s are correlated through the sharp foreground f and can be accurately aligned.

Segmentation Refinement

Using the deblurred foreground f, refined alpha maps are computed as $$\alpha = 1 - (i_k - f * h_k)/b. \quad (20)$$

The obtained alpha map are then deblurred using the same MID algorithm and thresholded to obtain a binary segmentation $m_k$ of the object. Because the linear system is well-posed, deblurring the alpha maps gives us a close solution to the true foreground segmentation. However, simple thresholding does not result in an accurate segmentation mask, which needs to be improved.

We refine segmentation 670 for each motion line independently. In one embodiment, we are using a conservative threshold, e.g., 0.65, to obtain an initial segmentation mask $m^0$ smaller than the size of the object. For each motion line, we expand segmentation mask one pixel on each side at a time, and find the best estimate, which minimizes the joint cost function $$J(m) = \sum_{k=1}^{N} (\alpha_k - m * h_k)^2, m \in \{0, 1\}. \quad (21)$$

The refinement is repeated for the entire blur region and the best segmentation is chosen to minimize the error for each motion line. Typically, we search within ten pixels on each side, which results in $10^2 = 100$ dilations for each scan line. Typically, the quality of segmentation and deblurring improves even after the first iteration. The refinement is iterated two or three times for the final result.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for reducing a blur in an image of a scene, comprising a processor for performing steps of the method, comprising the steps of:
   acquiring a set of images of the scene with a single conventional camera, wherein each image in the set of images includes an object having a blur associated with a point spread function (PSF) forming a set of point spread functions (PSFs), wherein the set of PSFs is suitable for null-filling operation; and
   inverting jointly the set of images and the set of PSFs to produce an output image having a reduced blur.

2. The method of claim 1, further comprising:
   acquiring the set of images with exposure times, which are non-integer multiples of each other.

3. The method of claim 2, further comprising:
   determining the exposure times such that a deconvolution operator is maximized.

4. The method of claim 2, further comprising:
   determining the exposure times such that the signal to noise is maximized.

5. The method of claim 1, wherein the set of PSFs includes a first PSF, the first PSF at a particular frequency is zero, and a second PSF, wherein the second PSF at the particular frequency is not zero.

6. The method of claim 1, further comprising:
   acquiring the set of images using multiple cameras running at different frame rates.

7. The method of claim 1, wherein the PSF is a motion PSF.

8. The method of claim 1, wherein the inverting further comprising:
   determining the output image according to $$\hat{f} = \left(\sum_{k=1}^{N} A_k^T A_k\right)^{-1} \left(\sum_{k=1}^{N} A_k^T i_k\right),$$

wherein $\hat{f}$ is a vector describing the output image, $A_k$ is a circulant motion smear matrix for an image k, $i_k$ is a vector describing the blurred object, N is a number of images in the set of images, T is a transpose operator.

9. A method for reducing blur in an image, comprising a processor for performing steps of the method, comprising the steps of:
   acquiring, with a single conventional camera, repetitively a set of images of a moving object with a set of exposures, wherein the exposures are non-integer multiples of each other;
   estimating a point spread function (PSF) using motion vectors computed from images acquired with the same exposure forming a set of point spread functions (PSFs);
   determining an alpha map for each image in the set of images;
   removing a background contribution from the images using the alpha map; and
   inverting jointly the set of images and the set of PSFs to produce an output image having a reduced blur.

10. The method of claim 9, further comprising:
    repeating the determining, the removing, and the inverting.

11. The method of claim 9, wherein the acquiring is performed using a camera having an auto exposure bracketing.

12. The method of claim 9, wherein for each image further comprising:
    estimating a background of the image; and
    generating a crude trimap by thresholding a difference between the image and the background.

13. The method of claim 9, further comprising:
    aligning the object in the set of images.

14. The method of claim 9, further comprising:
    refining a segmentation of the object for each motion line independently.

15. A camera configured for reducing blur in an image, comprising:
    means for acquiring a set of images of a moving object with a single conventional camera, wherein each image is associated with a point spread function (PSF) forming a set of point spread functions (PSFs), wherein the set of PSFs is suitable for null-filling operation; and
    means for inverting jointly the set of images and the set of PSFs to produce an output image having a reduced blur.

16. The camera of claim 15, wherein the set of PSFs includes a first PSF, the first PSF at a particular frequency is zero, and a second PSF, wherein the second PSF at the particular frequency is not zero.

17. The camera of claim 15, wherein the means for inverting further comprising:
    means for determining the output image according to $$\hat{f} = \left(\sum_{k=1}^{N} A_k^T A_k\right)^{-1} \left(\sum_{k=1}^{N} A_k^T i_k\right),$$

wherein $\hat{f}$ is a vector describing the output image, $A_k$ is a circulant motion smear matrix for an image k, $i_k$ is a vector describing the blurred object, N is a number of images in the set of images, T is a transpose operator.

18. The camera of claim 15, further comprising:
    means for estimating the set of PSFs.

19. The camera of claim 15, further comprising:
    means for segmenting the set of images.

* * * * *